US 9,830,218 B2

(12) United States Patent
Han et al.

(10) Patent No.: US 9,830,218 B2
(45) Date of Patent: Nov. 28, 2017

(54) CACHE MEMORY WITH FAULT TOLERANCE

(71) Applicant: ELECTRONICS AND TELECOMMUNICATIONS RESEARCH INSTITUTE, Daejeon (KR)

(72) Inventors: Jin-Ho Han, Seoul (KR); Young-Su Kwon, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 45 days.

(21) Appl. No.: 14/858,448

(22) Filed: Sep. 18, 2015

(65) Prior Publication Data

US 2016/0110250 A1    Apr. 21, 2016

(30) Foreign Application Priority Data

Oct. 20, 2014  (KR) .......................... 10-2014-0142023

(51) Int. Cl.
*G06F 11/10* (2006.01)
*G06F 12/0895* (2016.01)

(52) U.S. Cl.
CPC ...... *G06F 11/1064* (2013.01); *G06F 12/0895* (2013.01); *G06F 2212/1032* (2013.01)

(58) Field of Classification Search
CPC .................................................. G06F 11/1008
USPC ........................................ 714/764, 768, 773
See application file for complete search history.

(56) References Cited

U.S. PATENT DOCUMENTS

| 5,749,091 | A  | * | 5/1998  | Ishida ................. G06F 11/1407 711/121 |
| 5,901,281 | A  | * | 5/1999  | Miyao ................. G06F 11/1064 714/11 |
| 6,591,335 | B1 |   | 7/2003  | Sade et al. |
| 7,206,966 | B2 |   | 4/2007  | Barr et al. |
| 7,328,391 | B2 |   | 2/2008  | Hart et al. |
| 7,386,662 | B1 | * | 6/2008  | Kekre ................... G06F 3/0605 711/113 |
| 7,636,801 | B1 | * | 12/2009 | Kekre ............... H04L 29/08729 709/218 |
| 7,966,514 | B2 |   | 6/2011  | Surasinghe |
| 8,151,087 | B2 |   | 4/2012  | Lee et al. |

(Continued)

FOREIGN PATENT DOCUMENTS

| KR | 1020090051361 A | 5/2009 |
| KR | 1020130101926 A | 9/2013 |

Primary Examiner — Fritz Alphonse
(74) Attorney, Agent, or Firm — Ladas & Parry LLP

(57) ABSTRACT

The exemplary embodiments of the invention relates to fault tolerance of a cache memory which recovers an error occurred in the cache memory or reports an error. A cache memory may include a first layer cache configured to store data requested from a processor, together with a tag related to the data and parity check bits for detecting data error and tag error; a second layer cache configured to store data requested from the first layer cache, together with parity check bits and an error correction code(ECC) bit for detecting data error and tag error; and a fault tolerance unit configured to generate an error signal indicating whether the data error or tag error occurred in at least one of the first layer cache and the second layer cache is recoverable.

19 Claims, 3 Drawing Sheets

(56) References Cited

U.S. PATENT DOCUMENTS

| | | | |
|---|---|---|---|
| 8,352,719 B2* | 1/2013 | Grube | G06F 9/4401 |
| | | | 713/1 |
| 8,533,572 B2 | 9/2013 | Lu et al. | |
| 8,949,695 B2* | 2/2015 | Grube | G06F 11/1092 |
| | | | 714/770 |
| 2013/0238859 A1 | 9/2013 | Han | |
| 2014/0192583 A1* | 7/2014 | Rajan | G11C 7/10 |
| | | | 365/63 |
| 2015/0082122 A1* | 3/2015 | Udipi | G06F 11/1064 |
| | | | 714/764 |

\* cited by examiner

CACHE MEMORY WITH FAULT TOLERANCE

CROSS REFERENCE TO RELATED APPLICATION

This application claims the benefit of Korean Patent Application No. 10-2014-0142023, filed on Oct. 20, 2014, entitled "Cache memory with fault tolerance", which is hereby incorporated by reference in its entirety into this application.

BACKGROUND

1. Technical Field

The present invention relates to fault tolerance of a cache memory and more particularly, to fault tolerance of a cache memory which can recovers or reports an error detected in the cache memory.

2. Description of the Related Art

There is a cache memory (hereinafter, referred to as 'cache') between a processor and a main memory. The cache is a memory capable for faster response compared to the main memory by temporally storing instructions and data requested by a processor along with addresses.

When any error is occurred to a cache due to an external factor, a processor may read a wrong instruction from the cache and thus cannot interpret the instruction or performs an undesired operation. The processor may also read wrong data and thus undesired result may be provided.

Therefore, when any error is occurred to a cache, it is needed to recover or report such an error to the outside to be recovered properly.

SUMMARY

The exemplary embodiments of the present invention relates to a cache memory which is able to autonomously recover an error occurred in the cache or report an error to the outside to be recovered, when it cannot be autonomously recovered.

In accordance with one embodiment, there is provided a cache memory including: a first layer cache configured to store data requested from a processor, together with a tag related to the data and parity check bits for detecting data error and tag error; a second layer cache configured to store data requested from the first layer cache, together with parity check bits and an error correction code (ECC) bit for detecting a data error and a tag error; and a fault tolerance unit configured to generate an error signal indicating whether an error occurred in at least one of the first layer cache and the second layer cache is recoverable.

In an embodiment, the first layer cache may include a tag memory configured to store the tag and the parity check bit for detecting the tag error; a data memory configured to store the data and the parity check bit for detecting the data error; a dirty bit memory configured to store a dirty bit indicating whether the data stored in the data memory has been changed; and a first layer cache error checking unit configured to determine whether there is at least one of the tag error and the data error by checking the parity check bits stored in the tag memory and the data memory, respectively, and output at least one of a tag error signal and a data error signal based on the determined result.

In an embodiment, the second layer cache may include a tag memory configured to store the tag and the parity check bit for detecting the tag error; a data memory configured to store the data and the ECC bit for detecting the data error; a dirty bit memory configured to store a dirty bit representing whether data stored in the data memory has been changed; and a second layer cache error checking unit configured to determine whether there is at least one of the tag error and the data error by checking the parity check bit and the ECC bit stored in the tag memory and the data memory, respectively, and output at least one of a tag error signal and a data error signal based on the determined result.

In an embodiment, when there is at least one of the data error and the tag error in the first layer cache, the fault tolerance unit may determine whether the error is recoverable by checking associated dirty bit.

In an embodiment, when it is determined as that the error is recoverable, the fault tolerance unit may output an error signal representing that the error is recoverable and also outputs a second layer cache read request signal to recover the error.

In an embodiment, when it is determined as that the error is unrecoverable, the fault tolerance unit may output an error signal representing that the error is unrecoverable.

In an embodiment, when there is a tag error in the second layer cache, the fault tolerance unit may determine whether the tag error is recoverable by checking a second layer dirty bit related to the tag.

In an embodiment, when it is determined as that the tag error is recoverable, the fault tolerance unit may output an error signal representing that the error is recoverable and also outputs a main memory cache read request signal to recover the error.

In an embodiment, when it is determined as that the tag error is unrecoverable, the fault tolerance unit may output an error signal representing that the error is unrecoverable.

In an embodiment, when it is determined that a data error in the second layer cache, the fault tolerance unit may determine whether the data error is a single error or a double error.

In an embodiment, when the data error is a single error, the fault tolerance unit may output an error signal representing that the error is recoverable and recovers the error using the ECC bit.

In an embodiment, when the data error is a double error, the fault tolerance unit may determine whether the data error is recoverable by checking a second layer dirty bit related to the data.

In an embodiment, when it is determined as that the data error is recoverable based on the checked result of the second layer dirty bit, the fault tolerance unit may output an error signal representing that the error is recoverable and also outputs a main memory cache read request signal to recover the error.

In an embodiment, when it is determined as that the data error is unrecoverable based on the checked result of the second layer dirty bit, the fault tolerance unit may output an error signal representing that the error is unrecoverable.

In an embodiment, the first layer cache may further include: a processor write buffer configured to store data and an address of the data received from the processor; and a processor error checking unit configured to write the data and the address of the data stored in the processor write buffer in the data memory and the tag memory, respectively, when a signal representing that there is no error in the data stored in the processor write buffer is received from the processor.

In an embodiment, the first layer cache may further include a write buffer that is configured to store data and an address which are identical to the data and the address which are stored in the data memory and the tag memory to recover an error detected in the data memory or the tag memory of the first layer cache.

In an embodiment, the second layer cache may further include a write buffer that is configured to store data and an address which are identical to the data and the address which are stored in the data memory and the tag memory to recover an error detected in the data memory or the tag memory of the second layer cache.

According to the exemplary embodiments of the present invention, an error occurred in the cache can be determined for whether it can be recoverable based on an error type or can be reported to be recovered when the error is unrecoverable autonomously.

DESCRIPTION OF THE EXEMPLARY EMBODIMENTS

While the present invention has been described with reference to particular embodiments, it is to be appreciated that various changes and modifications may be made by those skilled in the art without departing from the spirit and scope of the present invention, as defined by the appended claims and their equivalents.

Throughout the description of the present invention, when describing a certain technology is determined to evade the point of the present invention, the pertinent detailed description will be omitted.

Unless clearly used otherwise, expressions in the singular number include a plural meaning.

In addition, "module", "unit", "interface" and the like among terms used in the present invention generally mean objects relating to a computer such as hardware, software and combinations thereof.

Exemplary embodiments of the invention will be described below in more detail with reference to FIG. 1 and FIG. 2.

Figure 1:
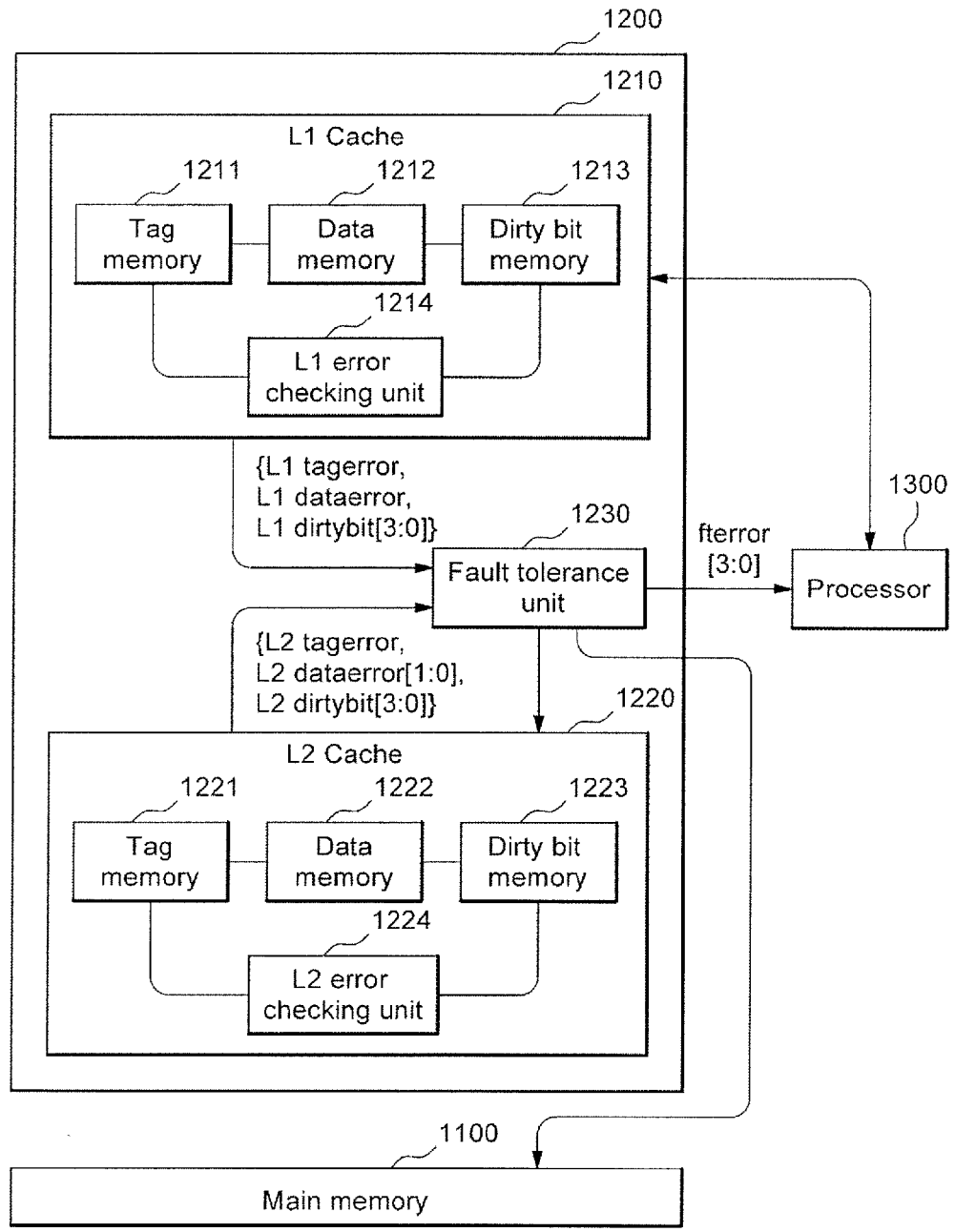
FIG. 1 is a block diagram illustrating a cache memory structure according to an embodiment of the present invention.

FIG. 1 is a block diagram illustrating a cache memory structure according to an embodiment of the present invention. As shown in FIG. 1, a cache memory 1200 is existed between a main memory 1100 (e.g., SDRAM) and a processor 1300. In an embodiment, the cache memory 1200 is a 2-layer cache including a L1 cache 1210 and a L2 cache 1220 in which data/instructions requested by a processor 1300 are stored. Here, there is shown a simple architecture of the cache to help understanding the present invention. However, the cache memory 1200 may be much more complex structure such as 3-layered, or 4-layered structure. Furthermore, each cache layer may have a multi-core structure with a plurality of caches. Therefore, it is appreciated to a person skilled in the art that it is not limited to a particular hierarchy structured cache memory.

In an embodiment, the cache memory 1200 includes a fault tolerance unit 1230 configured to deal with errors of the cache memory 1200. Although data or instructions can be stored in the L1 cache 1210 and the L2 cache 1220, they are collectively called as 'data' hereinafter.

The L1 cache 1210 may store data in a certain region of the memory 1100 including an address requested from the processor along with the requested address.

In an embodiment, the L1 cache 1210 may include a tag memory 1211, a data memory 1212, a dirty bit memory 1213 and a L1 error checking unit 1214.

The tag memory 1211 may store a tag of data and a parity check bit for detecting a tag error.

The data memory 1212 may store data and a parity check bit for detecting a data error.

The dirty bit memory 1213 may store a dirty bit representing whether the data stored in the data memory has been changed. In an embodiment, 4 dirty bits may be stored.

The L1 error checking unit 1214 may check parity check bits stored in the tag memory 1211 and the data memory 1213, respectively, to determine whether there is any of tag errors and data errors. The L1 error checking unit 1214 may output a L1 tag error signal(L1tagerror) when it is determined as that there is a tag error and output a L1 data error signal(L1 data error) when it is determined as that there is a data error.

The L2 cache 1220 may store data in a certain region including an address requested from the L1 cache 1210 along with the requested address.

In an embodiment, the L2 cache 1220 may include a tag memory 1221, a data memory 1222, a dirty bit memory 1223 and a L2 error checking unit 1224. Here, the tag memory 1221 of the L2 cache 1220 may store a tag and a parity check bit for detecting a tag error like the L1 cache 1210, but the data memory 1223 stores data and a 2-bit error correction code(ECC) for detecting a data error, which is only different from the L1 cache 1210.

The L2 error checking unit 1224 may detect whether there is any of tag errors and data errors by checking the parity check bit of the tag and the 2-bit error correction code of the data, which are stored in the tag memory 1221 and the data memory 1223, respectively, corresponding to the address requested from the L1 cache 1210.

The L2 error checking unit 1224 may output a L2 tag error signal 'L2tagerror' when it is determined as there is a tag error and output a L2 data error signal 'L2data error' when it is determined as that there is a data error. Here, the L2 error checking unit 1224 may determine whether the error is a single error or a double error to output the L2 data error signal with a different value (e.g., data error[1]data error[2]).

In an embodiment, the fault tolerance unit 1230 may determine an error type of the cache memory based on an error signal from the L1 cache 1210 and/or the L2 cache 1220 to recover the error when the error is recoverable.

Particularly, the fault tolerance unit 1230 may receive the L1 tag error signal 'L1tagerror' and the L1 data error signal 'L1data error' and 4 L1dirty bits 'L1dirtybit' in the dirty bit memory 1212 accessed by the requested address from the L1 cache 1210, and the L2 tag error signal 'L2tagerror' and the L2 data error signal 'L2 data error' and 4 L2 dirty bits 'L2dirtybit' in the dirty bit memory 1222 accessed by the requested address from the L2 cache 1220.

The fault tolerance unit 1230 may determine an error type based on the L1 tag is error signal 'L1tagerror', the L1 data error signal 'L1 data error' and the L1 dirty bit received from the L1 cache 1210, and the L2 tag error signal 'L2tagerror', the L2 data error signal 'L2 data error' and the L2 dirty bit 'L2dirtybit' received from the L2 cache 1220 to generate an error type signal 'fterror' representing the error type.

In an embodiment, an error type signal 'fterror' value may be composed with 4 bits and have the following meaning.

The first type error signal (fterror[0]): A recoverable error is occurred in the L1 cache The second type error signal (fterror[1]): An unrecoverable error is occurred in the L1 cache The third type error signal (fterror[2]): A recoverable error is occurred in the L2 cache The fourth type error signal (fterror[3]): An unrecoverable error is occurred in the L2 cache Furthermore, the fault tolerance unit 1230 may generate a read request signal to recover an error. Particularly, the fault tolerance unit 1230 may generate a cache read request signal for requesting read to the L2 cache to recover an error occurred in the L1 cache and/or a memory read request signal for requesting read to the main memory to recover an error occurred in the L2 cache.

Figure 2:
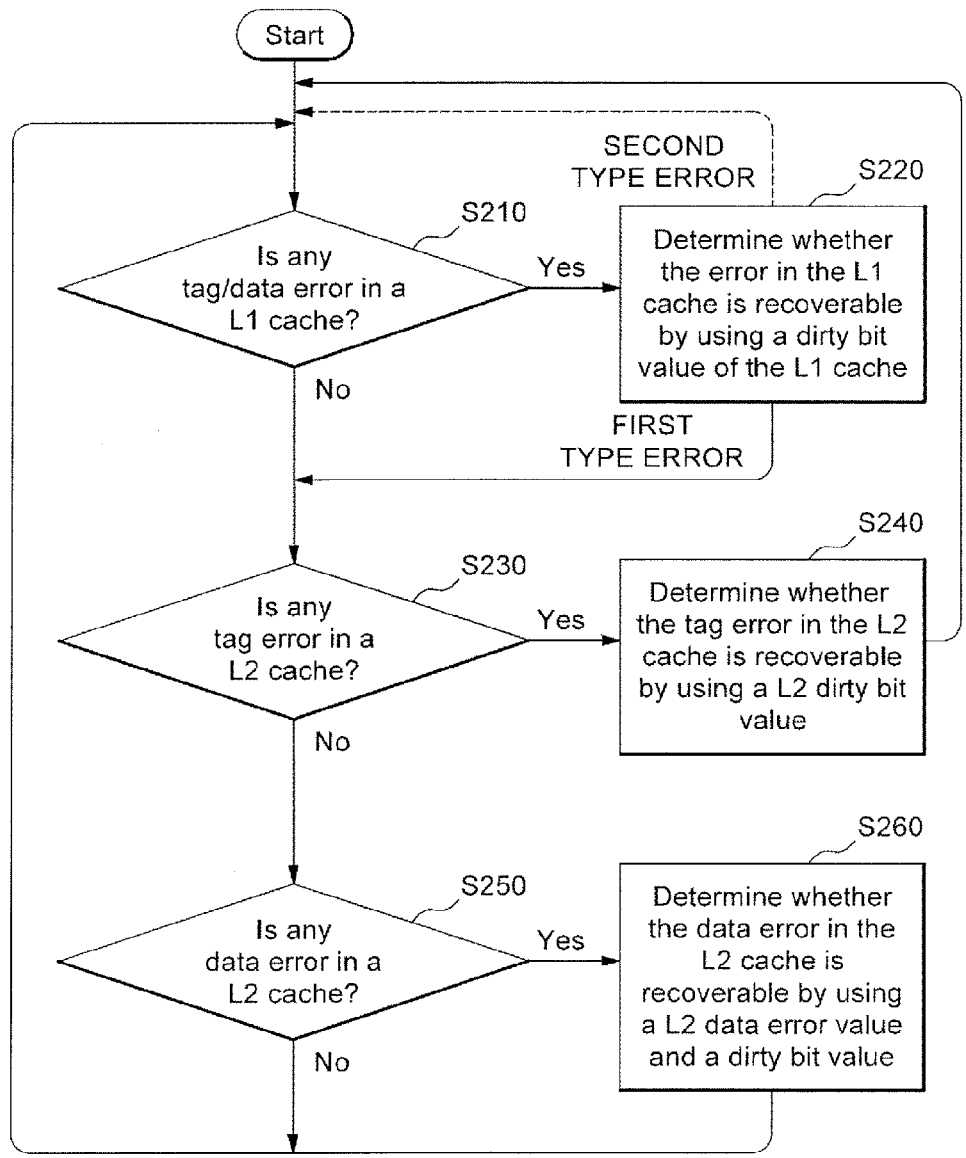
FIG. 2 is a flowchart illustrating fault tolerance operation of a cache memory according to an embodiment of the present invention.

FIG. 2 is a flowchart illustrating fault tolerance operation of a cache memory according to an embodiment of the present invention.

In S210, when data is requested from a processor to a L1 cache, any data error and/or tag error of the L1 cache is checked.

When it is determined as that any data error and/or tag error is in the L1 cache, it is determined whether the error in the L1 cache is recoverable by using a dirty bit value of the L1 cache. According to the result, the first type error signal representing that a recoverable error is occurred in the L1 cache or the second type error signal representing that an unrecoverable error is occurred in the L1 cache is generated in S220.

In an embodiment, when all L1dirty bit values are '0', the error is recoverable in the L1 cache so that the first type error signal is generated. A L2 cache read request signal may be also generated to recover the error. However, when all L1dirty bit values are not '0', it is determined as that the error is unrecoverable so that the second type error signal is generated since it means that the part corresponding to the data stored in the data memory of the L1 cache is not reflected to the L2 cache and the main memory after it is changed.

On the other hand, when there is no data error or tag error in the L1 cache, it proceeds to S230 to determine whether any tag error is in the L2 cache.

When it is determined as that there is a tag error in the L2 cache, it is determined whether the tag error occurred in the L2 cache is recoverable by using a L2dirty bit value and according to the result, the third type error signal representing that the recoverable L2 cache error is occurred or the fourth type error signal representing that the unrecoverable L2 cache error is occurred is generated in S240.

In an embodiment, when all L2 dirty bit values are '0', the error is recoverable in the L2 cache so that the third type error signal is generated. A main memory (e.g., SDRAM) read request signal may be also generated to recover the error. However, when all L2dirty bit values are not '0', it is determined as that the error is unrecoverable so that the fourth type error signal is generated.

On the other hand, when it is determined as that there is no tag error in the L2 cache, it may proceed to S250 to determine whether any data error is occurred in the L2 cache.

When it is determined as that there is no data error in the L2 cache, it is determined whether the data error occurred in the L2 cache is recoverable by using a L2 data error value and a dirty bit value, and according to the result, the third type error signal, representing that the recoverable L2 cache error is occurred, or the fourth type error signal, representing that the unrecoverable L2 cache error is occurred, may be generated in S260.

In an embodiment, it may be determined whether the data error occurred in the L2 cache error is a single error or a double error. When it is determined as that it is a single error, the third type error signal may be generated since it is recoverable by using an ECC bit stored in the data memory of the L2 cache.

However, when it is determined as that the data error occurred in the L2 cache error is a double error, L2 dirty bit values are checked. When all dirty bit values are '0', the third type error signal is generated since it is recoverable, while the fourth type error signal is generated when they are not '0' since it is unrecoverable.

In an embodiment, when the third type error signal is generated, a main memory (e.g., SDRAM) read request signal may be also generated to recover the error.

The above described fault tolerance operation may be repeated whenever data is requested to the L1 cache from the processor and a read request is made to the L2 cache or the main memory depending on an error type to recover the error. When the error is unrecoverable, it may report or notify the error to the outside to recover by a complicated way or by a system reset. Any way of responding to errors to the outside of the cache memory is not limited by the present invention.

Figure 3:
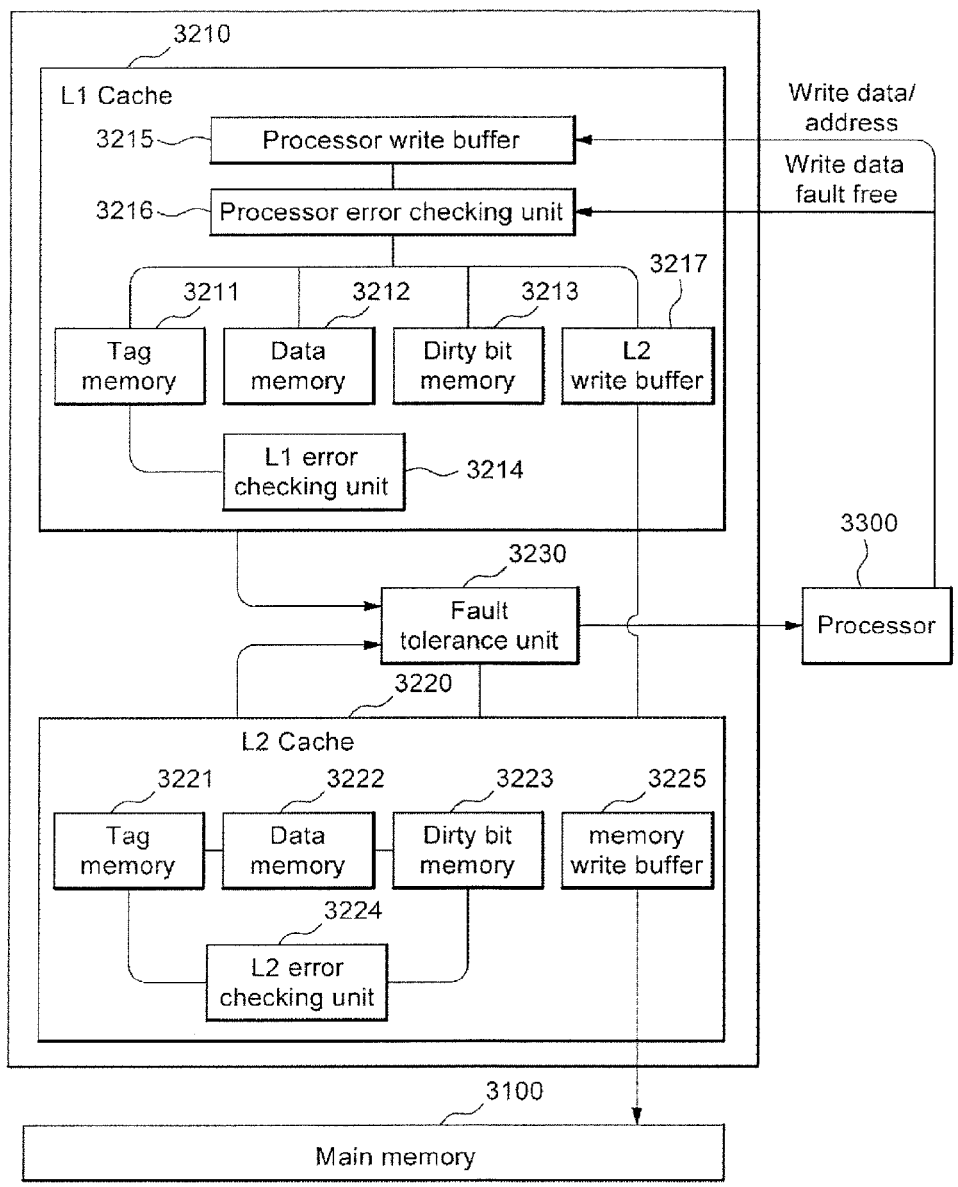
FIG. 3 is a block diagram illustrating a cache memory structure according to another embodiment of the present invention.

FIG. 3 is a block diagram illustrating a cache memory structure according to another embodiment of the present invention. As shown in FIG. 3, a L1 cache 3210 may include a tag memory 3211, a data memory 3212, a dirty bit memory 3213 and a L1 error checking unit 3214 as the L1 cache 1210 in FIG. 1 and further include at least one of a processor write buffer 3215, a processor error checking unit 3216 and a L2 write buffer 3217.

A L2 cache 3220 may include a tag memory 3221, a data memory 3222, a dirty bit memory 3223 and a L2 error checking unit 3224 as the L2 cache 1220 in FIG. 1 and further include a memory write buffer 3225.

In an embodiment, the processor write buffer 3215 is a buffer for storing write data received from the processor 3300 and the corresponding address. The processor 3300 may check a write data error stored in the processor write buffer 3215. When there is no error, the processor 3300 may provide a write data fault-free signal to the processor error checking unit 3216.

In an embodiment, when the write data fault-free signal is received from the processor 3300, the processor error checking unit 3216 may control to write the address and the data stored in the processor write buffer 3215 in the tag memory 3211 and the data memory 3212, respectively, and set each dirty bit of the tag memory 3211 and the data memory 3212 to be '1'. It may thus reduce errors of the L1 cache by determining whether there is a data error or not before the data is reflected to the L1 cache 3210

Furthermore, the processor error checking unit 3216 may write the data stored in the processor write buffer 3215 in the tag memory 3211 and the data memory 3212 of the L1 cache and write the data in the L2write buffer 3217 at the same time.

When a read request is received from the processor 3300, it is first determined whether there is data which matches to the address read-requested in the processor write buffer 3215. When there is data which matches to the read-requested address, the corresponding data stored in the processor write buffer 3215 may be transferred to the processor 3300. On the other hand, when there is no data which matches to the address read-requested in the processor write buffer 3215, the corresponding data searched in the L1 cache 3220 may be transferred to the processor.

According to the cache memory structure in FIG. 3, the L1 cache 3210 and the L2 cache 3220 may include the L2 write buffer 3217 and the memory write buffer 3225, respectively, to recover errors in the L1 cache 3210 and the L2 cache 3220.

The L2 write buffer 3217 is a buffer for storing data and address which are identical to the data and the address written in the tag memory 3211 and the data memory 3212 and is used to recover errors of the L1 cache 3210.

Data/address stored in the L2 write buffer 3217 may be written in the L2 cache 3220 successively and at the same time a dirty bit corresponding to the data may be changed from '1' to '0'. That is, since the dirty bit is '0', an error may be recovered by reading from the L2 cache 3220 even though any error is occurred in the tag memory 3211 and/or the data memory 3212. This operation may be performed at the same time when the L1 cache 3210 receives a new read request from the processor 3300.

On the other hand, when an error is detected in the L1 cache 3210 and is unrecoverable by using data/address of the L2 cache 3220 since a dirty bit is '1', the error may be recovered by using the L2 write buffer 3217. The L1 cache 3210 may search the L2 write buffer 3217 before a read request is transmitted to the L2 cache 3220 to recover the error.

When it is determined as that there is no error by reading data from the L2 write buffer 3217 and checking a parity bit, the data read from the L2 write buffer 3217 may be transmitted to the processor 3300. Furthermore, the error may be recovered by writing the data in the L1 cache 3210. On the other hand, when it is determined as that there is an error by checking a parity bit of the data store in the L2 write buffer 3217, an error signal may be transmitted to the fault tolerance unit 3230.

The memory write buffer 3225 in the L2 cache 3220 may be used for the same purpose as the L2 write buffer 3217. The memory write buffer 3225 is a buffer for storing data and address which are identical to the data and the address written in the tag memory 3221 and the data memory 3222 and is used to recover errors of the L2 cache 3220. Since operations of the memory write buffer 3225 are similar to those of the L2write buffer 3217, detailed explanation will be omitted.

The spirit of the present invention has been described by way of example hereinabove, and the present invention may be variously modified, altered, and substituted by those skilled in the art to which the present invention pertains without departing from essential features of the present invention. Accordingly, the exemplary embodiments disclosed in the present invention and the accompanying drawings do not limit but describe the spirit of the present invention, and the scope of the present invention is not limited by the exemplary embodiments and accompanying drawings. The scope of the present invention should be interpreted by the following claims and it should be interpreted that all spirits equivalent to the following claims fall within the scope of the present invention.

What is claimed is:

1. A cache memory comprising:
   a first layer (L1) cache configured to store L1 data requested from a processor, together with an L1 tag related to the L1 data and to store L1 parity check bits of the L1 tag and L1 data for detecting an L1 data error and an L1 tag error, and configured to determine whether there is the L1 tag error or the L1 data error by checking the L1 parity check bits of the L1 tag and the L1 data;
   a second layer (L2) cache configured to store L2 data requested from the first layer cache, and to store parity check bits of the L2 data and an L2 error correction code (ECC) bit for detecting an L2 data error and an L2 tag error and configured to determine whether there is the L2 tag error or the L2 data error by checking the L2 parity check bits of the L2 tag and the L2 data; and
   a fault tolerance unit configured to generate an error signal based on the determined results of the first layer cache and the second layer cache for indicating whether an error occurred in at least one of the first layer cache and the second layer cache is recoverable.

2. The cache memory of claim 1, wherein the first layer cache comprises:
   an L1 tag memory configured to store the L1 tag and the L1 parity check bit for detecting the L1 tag error;
   an L1 data memory configured to store the L1 data and the L1 parity check bit for detecting the L1 data error;
   an L1 dirty bit memory configured to store the L1 dirty bit indicating whether the L1 data has been changed; and
   a first layer cache error checking unit configured to determine whether there is at least one of the L1 tag error and the L1 data error by checking the L1 parity check bits stored in the L1 tag memory and the L1 data memory, respectively, and configured to output at least one of an L1 tag error signal and an L1 data error signal based on the determined results of the L1 parity check bits of the L1 tag and the L1 data memory.

3. The cache memory of claim 1, wherein the second layer cache comprises:
   an L2 tag memory configured to store the L2 tag and the L2 parity check bit for detecting the L2 tag error;
   an L2 data memory configured to store the an L2 data and the L2 ECC bit for detecting the L2 data error;
   an L2 dirty bit memory configured to store an L2 dirty bit representing whether L2 data has been changed; and
   a second layer cache error checking unit configured to determine whether there is at least one of the L2 tag error and the L2 data error by checking the L2 parity check bit and the L2 ECC bit stored in the L2 tag memory and the L2 data memory, respectively, and output at least one of an L2 tag error signal and an L2 data error signal based on the determined results of the L2 parity check bits of the L2 tag and the L2 data memory.

4. The cache memory of claim 2, wherein, when there is at least one of the L1 data error and the L1 tag error in the first layer cache, then the fault tolerance unit determines whether error in at least one of the L1 data and the L1 tag in the first layer cache is recoverable by checking the L1 dirty bit.

5. The cache memory of claim 4, wherein when error in at least one of the L1 data and the L1 tag in the first layer cache is recoverable, then the fault tolerance unit outputs an error signal representing that the error is recoverable and also outputs a second layer cache read request signal to recover the error.

6. The cache memory of claim 4, wherein when the error in at least one of the L1 data and the L1 tag in the first layer cache is unrecoverable, then the fault tolerance unit outputs an error signal representing that the error is unrecoverable.

7. The cache memory of claim 3, wherein, when there is the L2 tag error in the second layer cache, then the fault tolerance unit determines whether the L2 tag error is recoverable by checking the L2 dirty bit.

8. The cache memory of claim 7, wherein when the L2 tag error is recoverable, then the fault tolerance units outputs a read request signal to a main memory to recover the error.

9. The cache memory of claim 7, wherein when the L2 tag error is unrecoverable, then the fault tolerance unit outputs an error signal representing that the error is unrecoverable.

10. The cache memory of claim 3, wherein the fault tolerance unit determines, when there is the L2 data error in the second layer cache, whether the L2 data error is a single error or a double error.

11. The cache memory of claim 10, wherein the fault tolerance unit outputs, when the L2 data error is a single error, an error signal representing that the L2 data error is recoverable and recovers the L2 data error using the L2 ECC bit.

12. The cache memory of claim 10, wherein the fault tolerance unit determines, when the L2 data error is a double error, whether the L2 data error is recoverable by checking the dirty bit.

13. The cache memory of claim 12, wherein when the L2 data error is recoverable, then the fault tolerant unit outputs an error signal representing that the error is recoverable and also outputs a main memory read request signal to recover the error.

14. The cache memory of claim 12, wherein when the L2 data error is unrecoverable, then the fault tolerant unit outputs an error signal representing that the error is unrecoverable.

15. The cache memory of claim 2, wherein the first layer cache further comprises:
a processor write buffer configured to store the L1 data and an address of the L1 data received from the processor; and
a processor error checking unit configured to write the L1 data and the address of the L1 data stored in the processor write buffer in the L1 data memory and the L1 tag memory, respectively, when a signal representing that there is no error in the L1 data stored in the processor write buffer is received from the processor.

16. The cache memory of claim 2, wherein the first layer cache further comprises a write buffer that is configured to store data and an address which are identical to the L1 data and the address of the L1 data which are stored in the L1 data memory and the L1 tag memory to recover an error detected in the data memory or the L1 tag memory of the first layer cache.

17. The cache memory of claim 3, wherein the second layer cache further comprises a write buffer that is configured to store data and an address which are identical to the L2 data and the address of the L2 data which are stored in the L2 data memory and the L2 tag memory to recover an error detected in the L2 data memory or the L2 tag memory of the second layer cache.

18. A cache memory comprising:
a first layer (L1) cache configured to store L1 data from a processor, an L1 data parity check bit, an L1 tag, an L1 tag parity check bit, and an L1 dirty bit;
a second layer (L2) cache configured to store L2 data requested from the L1 cache, an L2 data parity check bit, an L2 error correction code (ECC) bit and an L2 dirty bit; and
a fault tolerance unit configured to generate an error signal based on values of the L1 data parity check bit, the L1 tag parity check bit, the L2 data parity check bit, and the L2 ECC bit for indicating whether an data error occurred in at least one of the L1 cache and/or the L2 cache, wherein when the L1 dirty bit and the L2 dirty bit both have a value of '0' then the data error is recoverable, and wherein when the L1 dirty bit and/or the L2 dirty bit have a value of '1' then the data error is unrecoverable.

19. The cache memory of claim 18,
wherein the L1 cache comprises:
an L1 tag memory configured to store the L1 tag and the L1 tag parity check bit for detecting an L1 tag error;
an L1 data memory configured to store the L1 data and the L1 data parity check bit for detecting an L1 data error;
an L1 dirty bit memory configured to store the L1 dirty bit for indicating whether the L1 data has been changed; and
an L1 cache error checking unit configured to determine whether an error exist in the L1 tag and/or the L1 data and configured to output an L1 tag error signal and/or an L1 data error signal based on respective values of the L1 tag parity check bit and/or the L1 data parity check bit; and
wherein the L2 cache comprises:
an L2 tag memory configured to store the L2 tag and the L2 tag parity check bit for detecting an L2 tag error;
an L2 data memory configured to store the L2 data and the L2 ECC bit for detecting an L2 data error;
an L2 dirty bit memory configured to store the L2 dirty bit for indicating whether the L2 data has been changed; and
a L2 cache error checking unit configured to determine whether an error exist in the L2 ECC and/or the L2 data and configured to output an L2 ECC error signal and/or an L2 data error signal based on respective values of the L2 ECC bit and/or the L2 data parity check bit.

* * * * *